Sept. 13, 1966  H. R. MONROE ETAL  3,273,110
UNDERWATER COMMUNICATION SYSTEM
Filed March 2, 1964
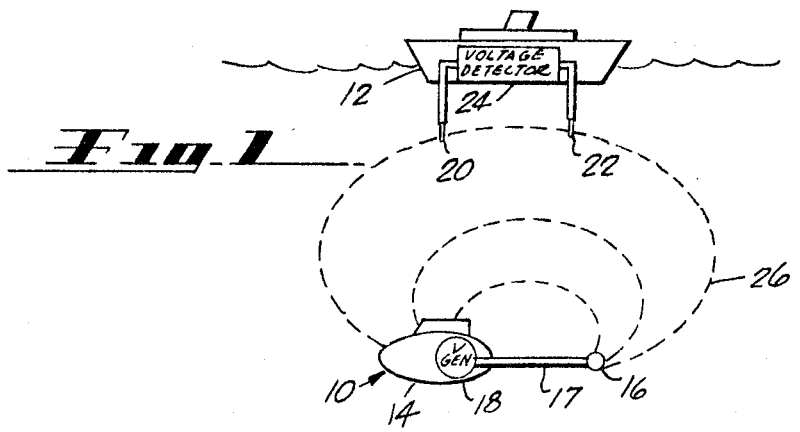
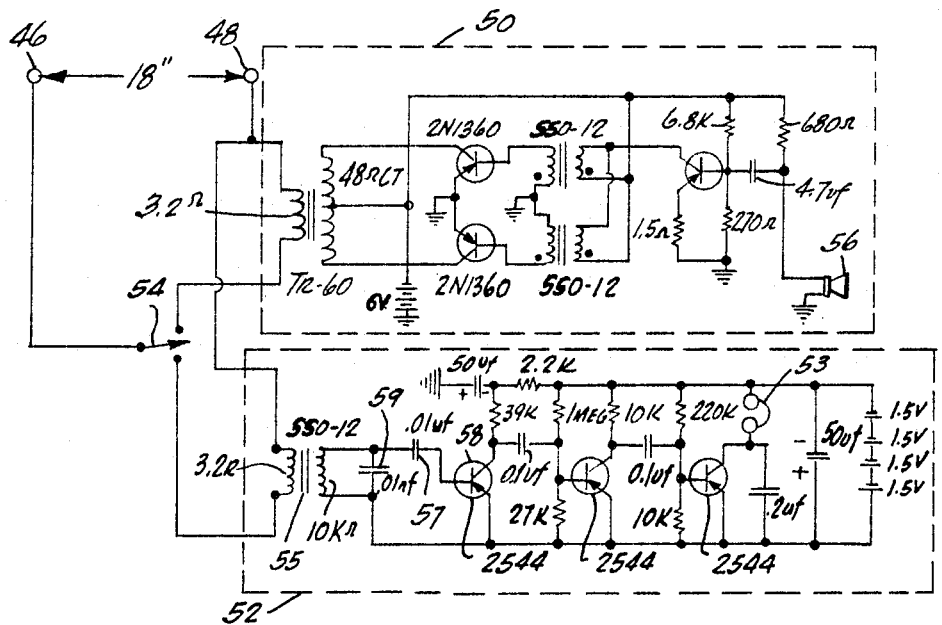
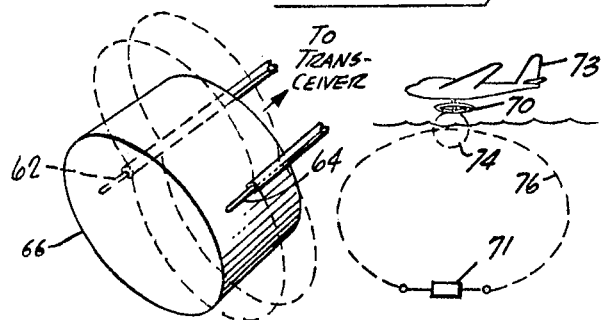
INVENTORS
HAROLD R. MONROE
VADIM N. ERDMAN
BY Leon D. Rosen
ATTORNEY

United States Patent Office 3,273,110
Patented Sept. 13, 1966

3,273,110
UNDERWATER COMMUNICATION SYSTEM
Harold Richard Monroe, Santa Ana, and Vadim N. Erdman, Los Angeles, Calif., assignors to Douglas Aircraft Company, Inc., Santa Monica, Calif.
Filed Mar. 2, 1964, Ser. No. 348,614
3 Claims. (Cl. 340—4)

This invention relates to communication systems and more particularly to a new means for communicating through conductive media.

The problem of communicating through water, especially where one communicating station is submerged at great depths, has been recognized as a difficult problem to solve. Radio communications, by means of ordinary electromagnetic waves has been tried in water and found unsatisfactory because the radiated power quickly dissipates. Sound propagation has been used but it is found that large amounts of power are required. This invention provides a method of communication which employs a wholly different and novel transmission means and apparatus, for enabling communication through water with a minimum of power and transmission losses.

The transmission means of this invention generally comprises a set of spaced probes which are immersed in water or some other conductive medium. When a voltage is applied to the spaced probes relative to each other a "dynamic" electric field is established between them. The dynamic field comprises a flow or drift of ions between the probes, along paths which extend into areas far removed from the probes. At these far removed areas, the field can be detected. Thus, a communication link is established between two locations far removed from one another and separated primarily by a conductive medium.

The shape of the dynamic field can be regarded as a number of curved lines extending between the transmitting or field establishing probes, each line constituting a path along which ions drift. The pattern of the lines is similar to those in typical representations of static electric fields or field of "force lines" between two charged bodies in a non-conducting medium or vacuum. The energy released by the transmitting probes is distributed not in the static electric field, which is very small in this communication system, but mostly in the kinetic energy of moving ions and the accompanying magnetic field. The ions in the conducting medium are in continuous motion from one transmitting electrode to the other, even when the voltage across these electrodes established by the transmitter remains at a constant magnitude.

Various conducting media can be used to support the dynamic fields established in the practice of the invention, such as fresh water, sea water, moist earth, or the fluid in animal tissues. The dynamic electric and magnetic fields theoretically extend to, and could be detected at great distances from the transmitting probes, but natural and man-made thermal and electrical noises limit the actual distances over which communications can be established.

The presence of the "dynamic" electric field or current field is basically detected as a difference in voltage or voltage drop between two spaced points situated in the conducting medium. The detection can be made by the use of another set of spaced probes, similar to the transmitting set, to which is connected a voltmeter. When the voltage on the transmitting probes varies or is removed, the voltage read by the voltmeter as the receiving probes varies or drops to zero. By turning on and off the voltage on the transmitting probes, information in the form of "dots" and "dashes" such as are used in Morse code and other code systems, may be transmitted. Greater rates of information transmission are more easily attained by rapidly varying the transmitting voltage, so that a tone, voice message or other rapidly varying waveform may be transmitted. Additionally, the voltage may be very rapidly varied to transmit a high frequency carrier signal which may be modulated by voice frequency signals or other signals to transmit information. Of course, the transmitting and receiving apparatus for communication over long distances is generally not a simple battery and voltmeter, but instead, sophisticated electronic equipment for producing and detecting voltages which vary in a closely controlled, relatively complex manner.

Although spaced probes are conveniently employed in the receiving apparatus, other devices may be utilized. For example, in one embodiment of the invention a coil is employed to detect the magnetic field resulting from the dynamic field or ion current created by the transmitter. Such a probe means is especially useful for aircraft which may fly low over the water, to communicate with underwater capsules or submarines without dragging a probe in the water. A coil probe held over the water by the aircraft can detect the magnetic field created over the water by the dynamic field in the adjacent water. Additionally, if proper coupling is obtained, the coil can induce currents in the water to transmit information.

In order to improve the efficiency, directivity, range and other characteristics of the system of the invention, a variety of innovations are resorted to, as will be explained in the description and claims set forth hereinbelow.

It should be clearly understood that although the system of the present invention possesses some elements apparently similar to radio communication systems used to transmit electromagnetic waves through the atmosphere, the two systems are actually quite different. Attempts have been made to try to adapt oridinary radio communications systems to the medium of water, but none is known to have been successful.

Electromagnetic or radio waves exist independently of their source, once radiated, unlike the situation with ion currents in which the drifting ions or electrons move only as long as the source is operating. When ordinary electromagnetic waves encounter ions, they dissipate their energy in causing the oscillation of the ions. The dissipated energy is not replenished by the source because the electromagnetic waves are independent of the source. Accordingly, when electromagnetic waves encounter conducting media such as sea water, their energy is quickly dissipated, and radio communication through water is not effective.

In the system of the present invention, the dynamic electric field is continuously supported by the transmitting energy source, and the thermal losses resulting from current flow through the conductive medium is constantly replenished. Part of the transmitting energy is accumulated as a magnetic field, which exists in the conducting medium by virtue of its inductance. At the relatively low frequencies (usually below 100 kc. and generally below 10 kc.) at which the system of the invention is conveniently operated, only a small portion of the released energy is radiated in the form of electromagnetic waves, and even this energy is intensively absorbed by the conductive medium.

The system of the present invention is especially useful in underwater communication, but is also useful in other conducting media as between two stations separated by the earth and in animal or body tissues, as from a capsule in the body to sensors located at the skin. The great simplicity of the device allows for its use in many applications where small size, low cost and reliability are needed.

Accordingly, it is a principal object of the present invention to provide a communication system and apparatus for enabling the efficient transmission of information through media of appreciable electrical conductivity.

Another object of the present invention is to provide a simple, relatively low power communication system for the transmittal of information from or to stations located at substantial depths in a sea water medium.

A further object of the present invention is to enable the transmittal of information in a medium of appreciable conductivity in preferred directions.

A further object of the present invention is to enable the transmission of information through a medium of appreciable conductivity by means of spaced probes, and with great efficiency.

A still further object of the present invention is to enable the wireless transmission of information from a body immersed in a conductive medium to a body located out of the conductive medium or at its periphery.

These and other objects, and a more complete understanding of the invention may be had by reference to the following description and claims taken in conjunction with the accompanying drawings in which:

FIGURE 1 is a simplified representation of a transmission system of the invention.

FIGURE 2 is a schematic circuit diagram of a transceiver for transmitting and receiving information by the means of the present invention.

FIGURE 3 is a pictorial view of a system of probes and an insulator for obtaining a highly efficient transmittal of information in accordance with the system of the present invention.

FIGURE 4 is a pictorial view of an embodiment of the invention which utilized a wire coil as a probe, the embodiment shown as used to communicate with an airplane flying over a water medium.

With reference to the drawings and more particularly to FIG. 1, one typical application of the present invention is to provide a communications link for transmitting information from a submerged diving capsule 10 to a surface ship 12. The diving capsule 10 includes an electrical conductive shell 14 which serves as a field probe and a small probe 16 positioned on the end of an insulating boom 17, the shell and small probe 14 and 16 serving as a set of transmitting probes. A voltage generating means 18 in the capsule is electrically connected between the capsule shell 14 and probe 16 by insulated conductors. The surface ship 12 contains a set of spaced receiving probes 20 and 22 protruding into the water and a voltage detecting means 24 electrically connected between the receiving probes.

When an electrical potential is established between the transmitting probes 14 and 16, a dynamic electric field or current flow is created in the water surrounding them. The pattern of the electric field is indicated by field lines 26, each line 26 being parallel to paths of current flow between the probes. In actual systems of three dimensions there are surface paths of current flow instead of lines, but the appearance is generally as indicated in FIG. 1. As shown in the figure, an appreciable dynamic electric field extends to a considerable distance from the transmitting probes 14 and 16. Thus, when a dynamic electric field is established between the probes 20 and 22, it can be detected by the detecting means 24 of the surface ship. When the voltage generating means 18 is turned off, no dynamic electric field is created and no voltage is detected by the detection means 24 of the ship 12.

An extremely simple embodiment of the invention can utilize a battery as the voltage generating means, the battery repeatedly being momentarily connected across the probes to transmit pulses. The detecting means 24 can utilize a voltmeter. When the voltmeter needle deflects, it indicates that the battery is being connected across the probes.

Instead of using an interrupted constant field which may easily be masked by noise, communication is generally more easily carried on by a rapidly varying field, such as those produced by interrupted tones or by voice signals.

An ordinary microphone and amplifier can be used to create the currents required for transmission of voice signals, the output of the amplifier circuit being connected between the spaced probes of the transmitter station. The field produced by this arrangement can be detected by an amplifier circuit connected between the spaced probes of the receiver station, the output of the amplifier circuit being connected to a loudspeaker or earphones.

A simple transmitting and receiving apparatus or transceiver, shown in FIG. 2, has been used for efficient voice communication through water by the system of this invention over distances of more than 300 yards using only 2 watts of power. The two stations between which communications were sent were identical, one serving as a transmitter when the other operated as a receiver. Each station included a pair of spaced probes 46 and 48 for establishing or detecting an electric field in the water, a transmitting circuit 50, a receiving circuit 52, and a switch 54 for selectively connecting the transmitting or receiving circuits 50 and 52 to the probes 46 and 48.

A detailed circuit diagram of the transceiver used in actual tests is shown in FIG. 2. The actual values of the components and examples of actual transistor and transformer types which can be used in the circuit are given. The transmitter circuit 50 includes a microphone 56 for converting sounds into electrical signals, and a very efficient push-pull amplifying and impedance matching circuit for providing large signals for transmission. The three transistors shown in the circuit 50 are of type 2N1360 manufactured by the Motorola Semiconductor Products Company, Inc., of Phoenix, Arizona. The transformers are of type TR–60 manufactured by the Thordarson Company of Mount Carmel, Illinois, and type SSO–12 manufactured by the United Transformer Corporation of New York City, New York. The receiver circuit 52 comprises an amplifier circuit, the output of which is connected to earphones 53. It includes transistors of type 2544 manufactured by the Philco Company of Lansdale, Pennsylvania. The single pole, double throw switch 54 enables the selective connection of the transmitting or receiving circuits to the probes 46 and 48 so that two-way communication can be made between stations.

The illustrated receiver circuit 52 includes several peculiarities of construction which make it extremely efficient for receiving low level signals of the type typically received in the use of the system. One feature is that the transistor 58, which is connected in a grounded emitter configuration has no direct current bias at its base input. Instead, there is a capacitor 57 connected in series with the base which can thus be termed as floating in the direct current sense. The transistors of audio amplifiers generally require a bias at the input in order to operate, but it is found that by including a capacitor in series with the transistor 58, but no bias, high amplification of low level audio signals is achieved. In actual tests with the three transistor circuit 52, audio signals were clearly detectable on the earphones 53, even though the signal potential between the probes 46 and 48 was less than one microvolt.

It is also found that when the capacitor 57 is placed in series connection with the base of transistor 58, a higher ratio of matching transformer 55 than is usually employed in similar situations is desirable. Ordinarily, the input impedance to the first stage of the receiver amplifier would be about 600 ohms, and for an impedance between the probes 46 and 48 of 5 ohms, the transformer would have a ratio of impedance of the low to the high impedance sides of about 1 to 120. In the receiver circuit 52 of the invention, a much higher ratio, of about 1 to 3000 is found to be needed; generally the ratio should be more than about 1 to 1000 to yield high efficiencies. A capacitor 59 is placed across the secondary of the matching transformer 55 to short circuit high frequency signals and prevent their being amplified by the receiver, which would cause a degradation of its amplifying abilities.

Generally it is desirable to provide a large separation between the probes 46 and 48 in order to obtain increased range. However, there are practical limitations on size, and for the probes used with the transceiver of FIG. 2 a separation of only 18 inches was easily provided. The probes 46 and 48 are bare conductor portions connected by insulated wires to the circuits. The impedance between the small probes at a distance of 18 inches in salt water was composed almost entirely of pure resistance, and was of the order of magnitude of 5 ohms for frequencies up to and including the audio range. (For 1 inch diameter, 2 inch long cylindrical probes separated at 18 inches, the impedance was found to be three and one-half ohms.) In order to obtain efficient use of the transceiver, the output impedance of the transmitting circuit 50 and input impedance of the receiving circuit 52 were designed to be of the order of magnitude of 5 ohms. For other separations of the probes, for example in shore installations where probe separations may be hundreds of feet or in small capsules swallowed by a patient where probe separation is a fraction of an inch, the ideal impedance ranges from several thousand ohms to tenths of an ohm. In sea water the impedance is generally of the order of magnitude of 5 ohms for separations of the probes of about a foot to several feet. Although impedance varies with probe separation, it does not vary linearly, and varies appreciably only for large differences in probe separations.

The probes of the device can be constructed out of any of a variety of conductive materials. However, it is found that many materials are corroded by salt water, especially where currents are sent through the materials and electrolytic breakdown of water into oxygen and hydrogen occurs. Thus, materials such as aluminum and copper quickly corrode and may form oxides which are partial insulators that reduce the conduction of currents to the surrounding water, or the probes may simply disappear into the water. The oxidation occurs even when no currents are being sent, as in the receiving mode. The sudden small changes in resistance result in noise which is objectionable when the probes are being used to receive weak signals. Accordingly, it is preferable to use non-corroding or non-oxidizing probes. Probes of carbon and probes of gold plated metals have been used successfully. Probes connected to transmitters are preferably rounded to prevent high field strengths which create ions that reduce transmitting efficiency and increase corrosion. The sharpness of receiving probes is not as important as with transmitting probes since receiving probes do not operate in such high strength fields.

The ends of simple wires may often be used as probes to establish electric fields. However, other shapes may be used to obtain greater directivity, different values of probe impedance, or other characteristics. As shown in FIG. 1, the case containing the sending or receiving station may itself serve as one probe.

An increase in efficiency often may be obtained by placing an insulator between the probes so that the major portion of the field is not concentrated in the volume directly between the probes. If the body or station on which the transceiver is located is an insulator or is covered with an insulator, the probes may be positioned on opposite sides of the station to increase efficiency. Alternatively, an arrangement illustrated in FIG. 3 may be used, in which the probes 62 and 64 are located on opposite sides of an insulating body 66. The impedance of the probes is higher when there is a large insulator positioned between them because there is then no straight line path for current flow through the water; such straight line current flows are generally wasteful, so effiiency is improved.

In some situations it is desirable to detect the dynamic electric field in a medium without immersing probes in the medium. For example, it is inconvenient for an airplane to have to drag a set of probes in the water to communicate with a submarine. A system for enabling the detection of the field without the immersion of probes is shown in FIG. 4. It comprises a coil 70 held above the water's surface 72 as by means of an airplane 73. The dnyamic electric field or current created by a transmitter 71 generates a magnetic field, just as do all currents. An imaginary magnetic field line 74 surrounds each dynamic current field line 76, and this magnetic field line extends out of the water. Thus, the coil 70 is threaded by the magnetic field line 76 which causes a minute current to flow in the coil that may be amplified and detected.

A coil probe may also be placed in the conductive medium, inasmuch as the magnetic field exists in the water as well as the atmosphere above the water. However, it has been found in practice that coils are more susceptible to interfering noises in industrial areas, especially 60 c.p.s. signals generated by electrical machinery and power lines which typically utilize 60 c.p.s. alternating current in the United States.

The shape and arrangement of the probes, the phases of any alternating currents or varying dynamic fields transmitted by sets of probes, the use of auxiliary systems of probes and other alterations and additions may be utilized to increase the efficiency of communication through water or other conductive media.

Accordingly, although certain advantageous embodiments of the invention have been illustrated, it will be understood by those skilled in the arts of electric field theory and circuitry and in the allied arts, that various modifications and changes may be made without departing from the scope of the invention as defined in the appended claims.

We claim:
1. A communication system for a station disposed in a conductive medium, said system including a receiver circuit comprising:
   an impedance matching input transformer having an input winding and an output winding, said input transformer having an impedance ratio of more than 1 to 1000 and having said input winding adapted to be connected to a pair of spaced probes disposed in the conductive medium;
   a first capacitor connected across said output winding, for dissipating signals of higher than audio frequency whereby broadcast signals and the like are generally dissipated;
   a first transistor amplifier stage including a first transistor connected in a first common emitter amplifying circuit having a base-emitter input and a collector-emitter output, said first transistor having a floating, non-direct current biased base whereby input signals to said base of said first transistor are not loaded down by a bias resistor;
   a second capacitor connected in series between one side of said output winding and said base of said first transistor, the other side of said output winding being connected to said emitter of said first transistor whereby the high impedance side of said input transformer is connected to said base-emitter input of said first amplifier stage and low frequency hum signals and the like are blocked from said base of said first transistor;
   second and third transistor amplifier stages including second and third transistors connected in respective second and third common emitter amplifying circuits which are connected in series, said second amplifier stage being connected to said collector-emitter output of said first amplifier stage, and said second and their transistors having respective direct current biased bases;

sound reproducing means for converting electrical signals received by said pair of spaced probes into audio sounds; and means connecting said third amplifier stage to said sound reproducing means for driving the same, whereby a highly efficient and effective interference-free received circuit for communication within a conductive medium is obtained.

2. A communication system as defined in claim 1 including:

a pair of spaced probes adapted for disposal in the conductive medium, said probes being constructed with a corrosion resistant and oxidation resistant conductive surface area which is exposed to the conductive medium;

a transmitter circuit comprising
   a microphone for converting sounds into electrical signals,
   a push-pull amplifier having an input and an output,
   means for applying the electrical signals to said input of said push-pull amplifier, and
   an oputut transformer connecting said output of said push-pull amplifier to said probes, said output of said push-pull amplifier having an impedance of the same general order of magnitude as the resistance between said probes when disposed in the conductive medium; and a switch having at least two positions for selectively connecting said spaced probes to said output transformer for transmitter operation in one switch position and to said input transformer for receiver operation in the other switch position.

3. A communication system as defined in claim 2 wherein said probes are each constructed with a generally cylindrical conductive surface area, and including an insulator which is disposed between said probes and is symmetrically shaped relative to said conductive surface areas of said probes to block, in a uniform manner, straight line and short distance current flow between said probes.

References Cited by the Examiner

UNITED STATES PATENTS

| | | | |
|---|---|---|---|
| 1,051,443 | 1/1913 | Pickard | 340—4 |
| 1,197,366 | 9/1916 | Hahnemann | 240—4 |
| 1,233,211 | 7/1917 | Fisher et al. | 340—4 |
| 1,331,640 | 2/1920 | Hahnemann | 340—4 |
| 2,404,806 | 7/1946 | Lindsey | 340—4 |
| 2,499,195 | 2/1950 | McNiven | 325—28 |
| 2,997,535 | 8/1961 | Brady et al. | 178—5.8 |
| 3,003,136 | 10/1961 | Burnett | 340—5 |
| 3,138,778 | 6/1964 | Dulin | 340—15 |

OTHER REFERENCES

Hardy, H. C., "A System of Short-Range Communication by Passing Audio-Frequency Electric Currents Through Water," University of Pennsylvania, June 1945, pages 1–8, 10, 12, 14, 16 and 21 relied on.

CHESTER L. JUSTUS, *Primary Examiner.*

R. A. FARLEY, *Assistant Examiner.*